United States Patent [19]

Yau

[11] 4,255,485

[45] Mar. 10, 1981

[54] BINDER FOR GLASS FIBER MAT

[75] Inventor: Ben J. Yau, Reynoldsburg, Ohio

[73] Assignee: Owens-Corning Fiberglas Corporation, Toledo, Ohio

[21] Appl. No.: 92,611

[22] Filed: Nov. 8, 1979

[51] Int. Cl.$^3$ .................... C08L 3/02; D04H 1/64; D04H 1/74

[52] U.S. Cl. .................... 428/288; 156/335; 260/17.2; 260/17.3; 260/17.4 ST; 428/290

[58] Field of Search .................... 260/17.2

[56] References Cited

U.S. PATENT DOCUMENTS

| | | | |
|---|---|---|---|
| 3,288,734 | 11/1966 | Stalego | 260/7 |
| 3,969,460 | 7/1976 | Fremont | 264/109 |
| 4,014,726 | 3/1977 | Fargo | 156/167 |
| 4,112,174 | 9/1978 | Hannes | 428/220 |
| 4,135,029 | 1/1979 | Pfeffer | 428/284 |

FOREIGN PATENT DOCUMENTS 670508  9/1963  Canada .................... 428/436

*Primary Examiner*—Edward M. Woodberry
*Attorney, Agent, or Firm*—Ronald C. Hudgens; Philip R. Cloutier; James B. Wilkens

[57] ABSTRACT

An aqueous binder composition suitable for bonding glass fibers in a porous random mat comprises a phenol-formaldehyde-urea condensate, starch, an emulsified thermoplastic resin, dimer acid, an emulsified oil and, optionally, an organosilane coupling agent. Such bonded mats are useful for impregnation or lamination with asphalt or resin compositions.

13 Claims, No Drawings

BINDER FOR GLASS FIBER MAT

FIELD OF THE INVENTION

This invention relates to bonded glass fiber mats comprising more or less randomly arrayed glass fibers bonded to one another with a resinous binder composition at enough of their points of crossing to provide enhanced strength and dimensional stability. Such mats can be impregnated and/or laminated with other materials, such as thermosetting resins or asphalt, whereby those other materials may be supported, reinforced and/or provided with dimensional stability. More particularly, the invention relates to a binder composition for bonding the glass fibers of such mats together, to the method of bonding the fibers of such mats using that composition and to mats wherein the glass fibers are bonded together with that composition.

BACKGROUND ART

Bonded glass fiber mats can be made from either short chopped fibers or long, essentially continuous fibers or mixtures of both short and long fibers. The fibers may originally, i.e. before matting and bonding, be present as individual filaments or a plurality of individual filaments may have been gathered together into multi-fiber strands. Furthermore, the fibers may have been provided with a very light coating of a sizing composition before being deposited to form the mat and having the binder composition applied, the function of such sizing (if any) being to protect the fibers from abrasion and consequent weakening during subsequent handling and/or to provide a more adherent substrate for the binder.

Previously, and particularly where glass fiber mat has been formed from multi-fiber strands, binder compositions comprising aqueous dispersions of phenol-formaldehyde or phenol-formaldehyde-urea resins, starch, bone glue, dimer acid and an organosilane have been found to be most suitable for many purposes, e.g. where the mat is to be saturated with asphalt and used as a roofing material. However, bone glue is not always readily available at reasonable cost and it is notoriously variable in quality, thereby introducing an undesirable variability into both the binder composition and the mat bonded therewith.

DISCLOSURE OF THE INVENTION

In one of its aspects the present invention is an aqueous composition suitable for application to glass fibers for bonding said fibers together in a porous mat, said composition comprising:
(a) a phenol-formaldehyde-urea condensate;
(b) starch;
(c) an emulsified thermoplastic resin selected from ethylene-vinylchloride polymers and ethylene-vinylacetate polymers;
(d) a dimer acid; and
(e) an emulsified oil.

Another aspect of the present invention is a method for bonding glass fibers in a mat, said method comprising:
(a) wetting the glass fibers throughout a porous random mat thereof with this aqueous composition;
(b) draining an excess, if any, of said liquid composition from said mat; and then
(c) heating the mat to expel volatile components and set the residue of said composition to bond the glass fibers together, the bonded mat remaining porous.

Yet a further aspect of the present invention is a porous glass fiber mat comprising randomly matted glass fibers, bonded together with the non-volatile residue of the aqueous composition above described.

The principal feature of the present invention lies in the substitution of a synthetic thermoplastic resin for the bone glue component of prior art binders to eliminate the undesirably severe variability associated with the use of bone glue, while retaining and even enhancing the desirable characteristics of such prior art binders containing bone glue.

The random mat of glass fibers can be formed by any of the methods known in the art. Thus, where long fibers are used, they can be deposited into the accumulating mat directly from the fiber forming process or they can first be wound onto a bobbin and subsequently unwound and deposited into the accumulating mat. For direct deposition, centrifugal attenuation of initially molten glass streams or attenuation thereof by entrainment in a stream of air or steam may be employed where discrete fibers are desired. Alternatively, the initially molten streams may be mechanically drawn into fine fibers and these may be gathered into multi-fiber strands before deposition into the mat; whether gathered into strands or not, these fibers may be coated with a suitable sizing composition by any conventional procedure, such as by pulling them across a roll or other smooth surface flooded with a suitable liquid sizing composition. Where the glass fibers are attenuated by mechanically drawing initially molten glass streams, the fibers so formed may be chopped into short lengths before deposition into the accumulating mat. These chopped fibers may be directly deposited to form the mat or they may be dispersed in water and the mat then formed by depositing this aqueous dispersion onto a screen or similar porous substrate and draining the bulk of the dispersion medium through the screen to leave the wet fibers deposited as a mat thereon. This latter so-called "wet process" is essentially similar to the classic process by which paper is made.

The liquid binder composition of this invention may be applied to the glass fibers comprising the mat by any method known to the art which is convenient in the circumstances. Thus, the liquid binder composition may be sprayed onto the fibers during their deposition into the mat or onto the mat itself. A particularly convenient method, which minimizes escape of binder into the workplace environment and also provides the possibility for conveniently recovering and recirculating excess liquid binder composition, is to immerse the unbonded mat in a body of the liquid binder composition or to flood the unbonded mat with the liquid binder composition, in either case draining off excess liquid binder composition, if any, which may be recovered and recycled. The mat will be heated, typically to about 175° to 300° C., to set the binder composition.

The phenol-formaldehyde-urea condensate component of the binder composition can be any such resin which can be dispersed in an aqueous medium and subsequently coalesced on to the glass fibers of the mat. This condensate can advantageously be produced by first forming a phenolic resole resin and then incorporating at least sufficient urea to scavenge any free formaldehyde. Preferably, the phenolic resole should be formed by reacting a phenol with a substantial molar excess of formaldehyde in the presence of a basic catalyst such as an alkaline earth hydroxide. Mot preferably, the mole ratio of formaldehyde to phenol should be at least about 3.5:1 and a mole ratio of about 4.2:1 is particularly satisfactory.

The starch component of the aqueous binder composition can be derived from any of the conventional plant sources of starch and will normally be cooked by immersion in hot water or steam at a temperature above the gelatinization temperature of the particular starch employed. The selection of starch will usually be made on the basis of cost and therefore relatively inexpensive crude milled starches will ordinarily be chosen. The raw starch will normally be cooked long enough to open substantially all the granules and gelatinize the starch-water slurry.

The emulsified thermoplastic resin may be an ethylene-vinylchloride polymer or an ethylene-vinylacetate polymer. While this resin may be emulsified with any emulsifying agent compatible with other components of the composition, anionic surfactants are preferred. A particularly suitable emulsified ethylene-vinylchloride polymer is AIRFLEX 4514. Another suitable emulsified ethylene-vinylchloride polymer is AIRFLEX 4500. (AIRFLEX is a registered trademark of Air Products, Inc.) Both of those polymers contain small proportions of amide functionality, have particle sizes from about 650 to 900 A, are emulsified with anionic surfactant and have a very slightly alkaline pH.

The dimer acid component may be any suitable dimer acid. Dimer acids are formed from fatty acids, usually the higher fatty acids derived from fats and oils, by concurrent dehydrogenation and addition with peroxide catalysis.

The emulsified oil may be any suitable mineral or vegetable oil emulsified with any emulsifying agent which is compatible with the other components of the aqueous binder composition, and particularly with the other emulsifying agents present in the composition. A wide variety of such materials are well known in the art and commercially available.

The silane coupling agent, if one is used, may be any of the many organosilanes known to be ueful as glass resin coupling agents. These are typically silanes having at least one silanol hydroxyl group, or a group readily hydrolyzable thereto, and at least one organic group non-hydrolyzably bonded to a silicon atom. Aminosilanes such as gamma-aminopropyltriethoxysilane are particularly suitable.

The proportions of the various components of the binder composition may vary widely, but usually proportions within the following approximate ranges, expressed as weight percentages of non-volatile materials, will be found satisfactory: 25–65% phenol-formaldehyde-urea condensate, 15–35% starch, 5–25% emulsified thermoplastic resin, 1–15% dimer acid, 1–15% emulsified oil. Preferably, proportions within the following narrower approximate ranges should be used: 30–60% condensate, 20–30% starch, 10–20% thermoplastic, 5–10% dimer acid, 5–10% oil. Other components such as silane coupling agents, antifoamers, biocides, pH control agents, etc. may also be present in small proportions.

The total concentration of non-volatile components in the aqueous binder composition can vary widely, but it will usually be found convenient and satisfactory to make up this composition at total solids in the range from about 5 to about 20 percent by weight of the total aqueous composition. Total solids from about 7 to about 12 percent by weight are preferred.

The amount of binder applied to the mat can vary considerably, but loadings in the range of about 10 to about 30 weight percent, preferably about 15 to about 25 weight percent, of non-volatile binder composition, based on the dry weight of the bonded mat, will be found advantageous.

DESCRIPTION OF PREFERRED EMBODIMENT

The following formulation has been found particularly satisfactory as a binder composition for glass fiber mats, including mats where the glass fibers are originally in the form of multi-fiber strands, and especially where the bonded mat is to be saturated with an asphalt composition for use as a roofing material. This composition is formulated by taking 34 weight parts of a lime catalyzed resole reaction product of phenol and formaldehyde in 1:4.2 mole ratio of phenol to formaldehyde dispersed at about 40 weight percent in water, incorporating 13.7 weight parts urea as 50 weight percent solution in water and stirring the mixture for about 2 hours to form a phenol-formaldehyde-urea condensate. In a separate container, 27.8 weight parts of a coarse milled corn starch are added to 840 weight parts cold water, and this mixture is then heated to 95° C. and held for 20 minutes, at which time 7.8 weight parts of dimer acid are introduced. The mixture is then cooled to 40° C. and 0.2 weight parts of gamma-aminopropyltriethoxysilane are added. Then the condensate and 33.4 weight parts of AIRFLEX 4514 ethylene-vinylchloride emulsion (containing 16.7 weight parts resin solids) are stirred in. The pH is adjusted to 8.5 with ammonia and finally 13 weight parts of an aqueous mineral oil emulsion containing about 55% by weight mineral oil emulsified with a non-ionic surfactant is added. Total solids are about 10% by weight.

It will be understood by those knowledgeable in the art that numerous variations and modifications can be made in the invention as described, and such variations and modifications are contemplated as within the scope of this invention.

I claim:

1. An aqueous composition suitable for application to glass fibers for bonding said fibers together in a porous mat, said composition comprising:
   (a) a phenol-formaldehyde-urea condensate;
   (b) starch;
   (c) an emulsified thermoplastic resin selected from ethylene-vinylchloride polymers and ethylene-vinylacetate polymers;
   (d) a dimer acid; and
   (e) an emulsified oil.

2. A composition according to claim 1 further comprising an organosilane coupling agent.

3. A composition according to claim 1 wherein said thermoplastic resin comprises an ethylene-vinylchloride polymer.

4. A composition according to claim 2 wherein said organosilane has at least one amine group non-hydrolyzably linked to a silicon atom thereof.

5. A composition according to claim 1 comprising about 30 to 60 weight percent of said condensate, about 20 to 30 weight percent of said starch, about 10 to 20 weight percent of said emulsified thermoplastic resin, about 5 to 10 weight percent of said dimer acid and about 5 to 10 weight percent of said emulsified oil, based on total non-volatiles.

6. A method for bonding glass fibers in a mat, said method comprising:
   (a) wetting the glass fibers throughout a porous random mat thereof with a liquid composition of claim 1;
   (b) draining an excess, if any, of said liquid composition from said mat; and then
   (c) heating the mat to expel volatile components and set the residue of said composition to bond the glass fibers together, the bonded mat remaining porous.

7. A method according to claim 6 wherein the glass fibers comprise long, substantially continuous elements.

8. A method according to claim 7 wherein said glass fibers are initially present in the mat as multi-fiber strands.

9. A method according to claim 8 wherein said multi-fiber strands are at least partially opened during said wetting and remain at least partially opened in the bonded mat.

10. A method according to claim 6 wherein said wetting is accomplished by flooding the mat with an excess of said liquid composition.

11. A porous glass fiber mat comprising randomly matted glass fibers, bonded together with the non-volatile residue of the aqueous composition of claim 1.

12. A mat according to claim 11 wherein said glass fibers comprise long, substantially continuous elements.

13. A mat according to claim 12 wherein said glass fibers comprise at least partially opened multi-fiber strands, the fibers of each strand being substantially parallel to each other.

* * * * *

UNITED STATES PATENT AND TRADEMARK OFFICE

Certificate

Patent No. 4,255,485

Patented March 10, 1981

Ben J. Yau

Application having been made by Ben J. Yau, the inventor named in the patent above identified, and Owens-Corning Fiberglas Corp. a corp. of Delaware, the assignee, for the issuance of a certificate under the provisions of Title 35, Section 256, of the United States Code, adding the name of Frank Paul McCombs as a joint inventor, and a showing and proof of facts satisfying the requirements of the said section having been submitted, it is this 24th day of November 1981, certified that the name of the said Frank Paul McCombs is hereby added to the said patent as a joint inventor with the said Ben J. Yau.

Fred W. Sherling
*Associate Solicitor.*